(12) United States Patent
Hans et al.

(10) Patent No.: US 7,643,628 B2
(45) Date of Patent: Jan. 5, 2010

(54) COMMUNICATION SYSTEM HAVING CONFERENCE SERVER

(75) Inventors: Martin Hans, Bad Salzdetfurth (DE); Norbert Schwagmann, Lehe (DE)

(73) Assignee: Infineon Technologies AG (DE)

( * ) Notice: Subject to any disclaimer, the term of this patent is extended or adjusted under 35 U.S.C. 154(b) by 899 days.

(21) Appl. No.: 11/337,078

(22) Filed: Jan. 19, 2006

(65) Prior Publication Data

US 2006/0234613 A1 Oct. 19, 2006

(30) Foreign Application Priority Data

Jan. 20, 2005 (DE) .................. 10 2005 002 803

(51) Int. Cl.
*H04M 3/42* (2006.01)
(52) U.S. Cl. .................. 379/202.01; 455/414.1
(58) Field of Classification Search ............ 379/202.01; 455/414.1
See application file for complete search history.

(56) References Cited

U.S. PATENT DOCUMENTS

| | | | |
|---|---|---|---|
| 5,440,624 A | 8/1995 | Schoof, II | |
| 5,483,588 A | 1/1996 | Eaton et al. | |
| 5,680,392 A | 10/1997 | Semaan | |
| 7,289,489 B1* | 10/2007 | Kung et al. | .................. 370/352 |
| 2004/0047461 A1 | 3/2004 | Weisman et al. | |
| 2004/0057449 A1 | 3/2004 | Black | |
| 2004/0119814 A1* | 6/2004 | Clisham et al. | .......... 348/14.08 |
| 2005/0031110 A1* | 2/2005 | Haimovich et al. | .... 379/202.01 |

FOREIGN PATENT DOCUMENTS

EP 1 006 706 A2 6/2000

OTHER PUBLICATIONS

Wu et al.; "Use of Session Initiation Protocol (SIP) and Simple Object Access Protocol (SOAP) for Conference Floor Control"; IETF Internet Draft, draft-wu-sipping-floor-control-04.txt, Mar. 2, 2003.
J. Rosenberg; "A Framework for Conferencing with the Session Initiation Protocol"; IETF Internet-Draft, draft-ietf-sipping-conferencing-framework-02.txt, Jun. 2004.
G. Camarillo et al.; "The Binary Floor Control Protocol (BFCP)"; IETF Internet-Draft, draft-ietf-xcon-bfcp-02.txt, Oct. 2004.

* cited by examiner

*Primary Examiner*—Creighton Smith
(74) *Attorney, Agent, or Firm*—Dickstein, Shapiro, LLP.

(57) ABSTRACT

A communication system having a conference server device, a conference control unit, a plurality of moderator units, and a plurality of telecommunication devices. The moderator units are used to control allocation of a communication right. The decisions of the moderator units regarding the allocation of the communication right are combined to form an unambiguous overall decision, and overall decision is made using a majority decision.

12 Claims, 4 Drawing Sheets

COMMUNICATION SYSTEM HAVING CONFERENCE SERVER

CROSS-REFERENCE TO RELATED APPLICATION

This application claims priority to German Patent Application Serial No. 10 2005 002 803.9, which was filed on Jan. 20, 2005, and incorporated herein by reference in its entirety.

FIELD OF THE INVENTION

The invention relates to a communication system having a conference server device, a plurality of moderator units and a plurality of telecommunication devices and to a method for controlling a conference.

BACKGROUND OF THE INVENTION

It is frequently necessary to provide communication between a plurality of users with the aid of telecommunication devices, a large number of telecommunication devices enabling communication between a plurality of conference participants. This communication is handled by means of a telecommunication conference system.

For the purposes of organized communication, a communication right for the transmission of a specific medium, for example audio data, video data or text data, is generally not allocated to all of the conference participants at the same time. The communication rights are allocated in accordance with specific rules, it being possible to control the allocation of communication rights using floor control and to control the rules using the floor policy in accordance with the Internet Engineering Task Force (IETF) standard.

The communication right for a communication medium, for example audio or video, is the right to transmit the communication medium. In other words, a communication right is the right to transmit a data stream for the chosen communication medium.

According to the prior art, systems which provide the conference participants with a plurality of microphones and loudspeakers for spoken communication are used in conference rooms. The microphone which is provided for a conference participant must be activated or switched on by the respective participant for communication. A microphone which has been activated or switched on blocks all the other microphones in the conference system, with the result that only one speaker or participant is ever active. According to one embodiment, a further microphone, for example that of a conference participant who is controlling the conference, may also be active. The communication right is only ever granted to one conference participant, and if required, to that conference participant who is controlling the conference.

According to the prior art, conference participants who are remote from one another can also communicate with one another by telephone or by means of a video conference, the participants being able to simultaneously transmit voice messages or other messages, that is to say, for example, messages using other media, in this case.

Comparable telecommunication conference systems and services likewise exist for mobile telecommunication devices, mobile telephones. One example of this is the "Direct Connect" PTT (push to talk) service from the company Nextel, which is known from the United States of America. In accordance with this service, a conference participant has to operate a key (which is designed for this purpose) on his mobile telephone, as in the case of "walkie-talkies", for example, in order to transmit messages, the transmission of messages by other conference participants being blocked during this period of time and only one single conference participant thus being granted a communication right, for example for communication using voice or video data.

Telecommunication conference systems can also be controlled by means of more complex allocation of communication rights. For example, a conference participant may be granted a communication right following a communication right for another conference participant, or it is possible to provide for three and only three conference participants to be granted a communication right at the same time. In general and in this specific context, the communication rights can be allocated by a human or mechanical entity, the so-called moderator.

In accordance with the telecommunication systems of the prior art, communication rights can be allocated and granted for different communication means, for example audio data, video data or text data.

A method for so-called "conference floor control" based on the "Session Initiation Protocol" (SIP) and on the "Simple Object Access Protocol" (SOAP) is described in Wu et al., Use of Session Initiation Protocol (SIP) and Simple Object Access Protocol (SOAP) for Conference Floor Control, IETF Internet-Draft, draft-wu-sipping-floor-control-04.txt, March 2003.

According to Wu et al., control of a multimedia conference having a plurality of conference participants is improved. By way of example, floor control can be used to avoid or resolve conflicts which result from simultaneous communication media inputs by a plurality of conference participants. The signaling operation for setting up, modifying and clearing multimedia sessions between the telecommunication devices and the conference server device and the transmission of signaling data to other telecommunication devices or communication services servers are effected using the SIP (Session Initiation Protocol) specified by the IETF (Internet Engineering Task Force).

The characteristics of an SIP signaling process, that is to say of a signaling procedure according to the SIP which is implemented for an application, may be very different for different applications.

By way of example, the sizes of the SIP messages which are transmitted in an SIP signaling process, the frequency with which SIP messages are transmitted in a signaling procedure according to the SIP, and the transmission priority of individual SIP messages which are transmitted in an SIP signaling process may vary greatly. In the case of a voice communication link (session), SIP messages are transmitted, for example, when setting up the communication link, during the call (for example for the purpose of reconfiguring the communication link) and when ending the communication link.

In a multimedia conference having at least two telecommunication devices, the signaling processes are controlled by means of so-called SIP dialogs.

The SIP allows, in particular, a multiparty voice communication link, this voice communication link being based on a so-called "tightly coupled conference", as described in J. Rosenberg, A Framework for Conferencing with the Session Initiation Protocol, IETF Internet-Draft, draft-ietf-sipping-conferencing-framework-02.txt, June 2004.

A tightly coupled conference is a conference in which a central functional unit, the so-called focus, is a mediator which interacts with each conference participant.

EP 1 006 706 A2 discloses a method and a system for setting up and controlling a secondary telephone conference in a main telephone conference, the system having a secondary conference system for providing a secondary telephone call, the system responding to a request for a secondary telephone conference, and the system transmitting the request for a secondary telephone conference from a first terminal to a second terminal during the main telephone conference. According to EP 1 006 706 A2, the telephone conferences are run using a WLAN (wireless local area network). The system also has a so-called "gatekeeper" which is set up to control the conferences and grants communication rights to the conference participants.

U.S. Pat. No. 5,440,624 discloses a method and a system for automatically running and controlling an electronic network conference. A defined but flexible rule base manages the conference which is implemented and evaluated by a conference control unit. The rule base is also automatically implemented by a conference administration system, that is to say the conference is managed taking into account the rule base in order to control the allocation of communication rights, a conference control unit controlling the network conference.

U.S. Pat. No. 5,483,588 discloses a telephone conference system having a conference control unit which eliminates the need to control the telephone conference using a human operator.

G. Camarillo et al, The Binary Floor Control Protocol (BFCP), IETF Internet-Draft, draft-ietf-xcon-bfcp-02.txt, October 2004 describes the Binary Floor Control Protocol (BFCP) which is to be used for "conference floor control" in a conference system in accordance with the IETF.

A communication system 100 according to the prior art will be described below with reference to FIG. 1, the architecture being in the form of a star.

The communication system 100 also has a communication server device 101 as well as a multiplicity of telecommunication terminals which are set up as mobile radio terminals in accordance with this exemplary embodiment and are generally referred to below as telecommunication devices (in accordance with this exemplary embodiment, a first telecommunication device 102, a second telecommunication device 103, a third telecommunication device 104 and a fourth telecommunication device 105), a signaling link 106 between the communication server device 101 and the first telecommunication device 102, a signaling link 107 between the communication server device 101 and the second telecommunication device 103, a signaling link 108 between the communication server device 101 and the third telecommunication device 104, a signaling link 109 between the communication server device 101 and the fourth telecommunication device 105, a first conference participant 110 who is associated with the first telecommunication device 102, a second conference participant 111 who is associated with the second telecommunication device 103, a third conference participant 112 who is associated with the third telecommunication device 104, and a fourth conference participant 113 who is associated with the fourth telecommunication device 105.

The communication system 100 is embodied in accordance with the UMTS architecture described by 3GPP.

Current push to talk (PTT) systems and conference systems according to the prior art have the disadvantage, in particular, that the communication rights can be allocated using one and only one moderator unit. If the allocation of the communication right is to be decided using a plurality of moderator units, this decision must be made using means which are outside the conference. In other words, this means that the decision on the allocation of the communication right is made using an implementing moderator unit which is outside the conference and is thus not directly part of the conference. The conference is then informed of the decision, in which case this operation of informing the conference is not effected automatically and the process of coming to a decision may require lengthy discussions.

Document U.S. Pat. No. 5,680,392 describes a method for reserving radio resources for a conference, in which a user sends a request for the provision of radio resources which are required for the conference. A plurality of control units determine whether they can provide radio resources required for the conference and inform a master reservation unit of the result. The master reservation unit informs the user of whether the radio resources which are required for the conference are available.

Document US 2004/0057449 discloses a method for providing group communication for a group of communication terminals. The communication terminals send data packets (which need to be transmitted) to a communication management unit which operates as a switch and forwards the data packets.

US 2004/0047461 describes a conference system having a conference server unit. The conference server unit manages a conference and undertakes the task of media mixing, for example. A moderator can control who may participate in a conference.

SUMMARY OF THE INVENTION

The invention is based on an object of unambiguously providing for, in a simple and cost-effective manner, the allocation of communication rights in the case of a multiplicity of telecommunication subscribers and in the case of a multiplicity of moderator units.

The object is achieved by means of a communication system, a method for controlling a conference in a communication system, a telecommunication conference control unit and a method for controlling the allocation of communication rights.

Provision is made of a communication system having a conference server device, a conference control unit, a plurality of moderator units and a plurality of telecommunication devices, the conference, server device being set up in such a manner that it provides at least one conference for the plurality of telecommunication devices; each of the plurality of telecommunication devices having a message generation unit for generating a communication request message and a transmission device for transmitting the communication request message to the conference server device; the conference server device having a receiver device which is set up to receive the communication request messages, a message generation unit for generating a notification message if a communication request message has been received, and a transmission device which is set up to transmit notification messages to all of the moderator units; each of the plurality of moderator units having a receiver device which is set up to receive the notification messages, a message generation unit for generating a communication right decision message on the basis of all of the notification messages, and a transmission device for transmitting the communication right decision message to the conference server device; the plurality of moderator units being set up in such a manner that they each decide, independently of one another, which telecommunication device is to be granted a communication right and in such a manner that they inform the conference server device of these communication right individual decisions; and the conference control unit being set up in such a manner that the communication right individual decisions of the plurality of moderator units are automatically combined to form an overall decision which specifies which telecommunication device is granted a communication right.

Provision is also made of a method for controlling a conference in a communication system having a conference server device, a conference control unit, a plurality of moderator units and a plurality of telecommunication devices, the conference server device providing at least one conference for the plurality of telecommunication devices; each of the plurality of telecommunication devices generating a communication request message and transmitting the communication request message to the conference server device; the conference server device receiving the communication request messages, generating a notification message if a communication request message has been received, and transmitting notification messages to all of the moderator units; each of the plurality of moderator units receiving notification messages, generating a communication right decision message on the basis of all of the notification messages, and transmitting the communication right decision message to the conference server device; the plurality of moderator units each deciding, independently of one another, which telecommunication device is to be granted a communication right and informing the conference server device of these communication right individual decisions; and the conference control unit automatically combining the communication right individual decisions of the plurality of moderator units to form an overall decision which specifies which telecommunication device is granted a communication right.

Provision is also made of a telecommunication conference control unit having a reception unit, a decision unit and a message generation unit, the reception unit being set up to receive communication right individual decision messages from a plurality of moderator units, each of which messages contains a proposal for the allocation of a communication right; the decision unit being set up to automatically make an overall decision on the allocation of a communication right to a telecommunication device on the basis of the communication right individual decision messages; and the message generation unit being set up to generate an overall decision message in accordance with the overall decision.

Provision is also made of a method for controlling the allocation of communication rights, in which communication right individual decision messages are received from a plurality of moderator units, each of which messages contains a proposal for the allocation of a communication right; an overall decision on the allocation of a communication right to a telecommunication device is automatically made on the basis of the communication right individual decision messages; and the message generation unit is set up to generate an overall decision message in accordance with the overall decision.

The communication system is preferably configured in accordance with a 3GPP standard.

The communication system is also preferably configured in accordance with the UMTS standard.

The moderator units preferably each decide anonymously on the allocation of communication rights.

The communication system preferably has a communication right allocation device for controlling the allocation of communication rights in accordance with the overall decision.

The communication right allocation unit is preferably set up in such a manner that a communication right is allocated according to defined rules, that is to say using a rule base.

The communication system is also preferably set up in such a manner that a communication right is respectively allocated for different communication means.

Clearly, the invention may be seen in the fact that the signaling options which are permissible in accordance with standards for communication systems, for example the IETF or 3GPP standard, are used in accordance with floor control and permissible conference systems or are permissibly extended within the scope of the standard in order to easily achieve new functionality with respect to the standard.

The invention makes it possible, in particular, for the collisions which are described above in accordance with the prior art and which occur when coming to a decision for the purpose of granting a communication right to be resolved since, even in the case of an ambiguous decision using means which are outside a conference, i.e. a telecommunication conference control unit, an overall decision on the allocation of a communication right is always made and this overall decision is automatically implemented by the conference server device, the telecommunication conference control unit being a moderator unit of a second decision-making instance.

In other words, this avoids lengthy discussions between the moderator units as regards the allocation of a communication right, as occur in accordance with the prior art. According to the invention, it is thus also possible for an overall decision to always be unambiguously provided using simple means, even when there are a multiplicity of telecommunication subscribers.

According to the invention, a plurality of moderator units of a first decision-making instance vote, individually and independently of one another, on the allocation of a communication right, the individual decision of a moderator unit being a decision proposal for the allocation of communication rights. The decision proposals of the moderator units are automatically (that is to say using a device which has been set up for this purpose, the telecommunication conference control unit, or using a method) combined to form an overall decision or overall vote. This overall decision is also used to automatically control the allocation of communication rights.

In other words, a plurality of conference participants request a communication right from a conference server unit at virtually the same time. A plurality of moderator units of a first decision-making instance are used to create proposals for the allocation of a communication right on the basis of these communication right requests, the moderator units of the first decision-making instance creating a decision proposal individually and independently of one another. The moderator units of the first decision-making instance inform the conference server unit of their respective decision proposal. A device which has been set up for this purpose, i.e. the telecommunication conference control unit, or a method is used to automatically convert the decision proposals into an overall decision which is used to control the allocation of communication rights.

Clearly, the invention may be seen in the fact that a telecommunication conference control unit is informed of the decision proposals of a plurality of moderator units which make a decision independently of one another, said telecommunication conference control unit then deciding on the allocation of communication rights on the basis of said decision proposals. The moderator units may also make a decision anonymously, i.e. in the form of a secret vote. The decisions of the moderator units are made according to defined rules, i.e. using a rule base, the rules automatically being complied with by the telecommunication conference control unit.

According to the invention, the overall decision is automatically implemented by the telecommunication conference control unit without further action by the moderator units. Moreover, an overall decision is thus always unambiguously provided and implemented using the conference control unit.

Preferred developments of the invention emerge from the dependent claims. The other refinements of the invention which are described in connection with the communication system provided also apply in appropriate fashion to the method for controlling a conference in a communication system, to the telecommunication conference control unit and to the method for controlling the allocation of communication rights.

In one embodiment, the conference control unit may be anonymously informed of the individual decisions of the moderator units.

In one embodiment, the moderator units can vote using an electronic "voting application" (e-voting application). According to the invention, the voting application informs the telecommunication conference control unit of the result, the conference control unit forming an overall decision from said result and informing the conference server device of this decision. The voting application may be executed on the conference server device.

According to the invention, the telecommunication conference control unit may be set up in the form of hardware or software, and the voting application may be executed on the server.

In another embodiment, the telecommunication conference control unit is set up to make a decision using a weighted majority decision instead of a majority decision.

In addition, according to another embodiment of the invention, the communication right may also be allocated to the telecommunication devices by chance in the event of an ambiguous overall decision.

In another embodiment of the invention, a moderator unit of second instance may be provided. In the case of an ambiguous overall decision (for example if the purely computational evaluation of a voting result of the moderator units of first instance does not lead to an unambiguous overall result as regards the allocation of communication rights), this embodiment provides for the moderator unit of second instance to make a definitive and then unambiguous overall decision on the allocation of communication rights, preferably taking into account the individual decisions of the moderator units of first instance.

In another embodiment of the invention, the moderator unit of second instance may additionally also be a moderator unit of first instance, or the communication system may be set up in such a manner that it provides a plurality of moderator units of second instance, it also being possible to provide more than two instances of moderation.

In principle, any desired number of intermediate decision levels, and thus any desired number of moderator units of different higher instances, may be provided according to the invention, said moderator units combining the respective individual decisions or intermediate decisions of lower "moderator hierarchical levels" to finally form an unambiguous overall decision on the allocation of communication rights.

According to another embodiment of the invention, the communication system is set up in such a manner that a moderator unit of first instance is also a moderator unit of second instance, it being possible to select the decision at first instance of the moderator unit of second instance as an unambiguous overall decision. Moreover, the individual decisions of the other moderator units are then not transmitted to the moderator unit of second instance, the moderator unit of second instance consequently not transmitting an overall decision to the conference control unit.

In addition, provision may also be made for the conference control unit to be implemented on the conference server device or another device if said control unit has been implemented in the form of software.

According to the invention, the moderator units may also be in the form of mechanical moderator units.

According to another embodiment of the invention, the signaling operations (which indicate which telecommunication device receives a communication right) between the moderator units and the conference server device may be effected using text messages.

In another preferred embodiment of the invention, the moderator units may be informed of the communication right request by means of a notification message, the moderator units automatically being subscribed for notification.

According to another preferred embodiment of the invention, the communication signaling operations to the telecommunication devices may also be based on the Session Initiation Protocol (SIP), the notifications being effected, according to the invention, in accordance with the SIP floor control event package, as described in Wu et al.

According to another preferred embodiment, it may be provided that, as soon as a telecommunication device, i.e. a conference participant, receives a moderator right, said device is registered with the conference server device by means of a "subscribe" SIP message for the notification of communication right requests, this registration being performed automatically by a device or program which allocates moderator rights. The moderator is then informed of communication right requests, using a "notify" SIP message, by the event "queueChanged" being reported or displayed.

According to another preferred embodiment of the invention, communication right administration control commands can be transmitted using the Simple Object Access Protocol (SOAP), as described in Wu et al. In particular, the communication right requests from the conference participants and the overall decision of the conference control unit can be signaled using the SOAP ("ClaimFloor" and "GrantFloor" control commands). The SOAP messages can be formatted in accordance with the IETF proposal, as described in Wu et al.

The refinements of the invention described above in connection with the SOAP are analogously provided, in alternative embodiments of the invention, for a system based on the Binary Floor Control Protocol (BFCP) described in G. Camarillo et al.

BRIEF DESCRIPTION OF THE DRAWINGS

Exemplary embodiments of the invention are illustrated in the figures and are explained in more detail below, identical components being provided with identical reference symbols.

In the figures.

DETAILED DESCRIPTION OF PREFERRED EMBODIMENTS OF THE INVENTION

Exemplary Embodiment 1

Figure 1:
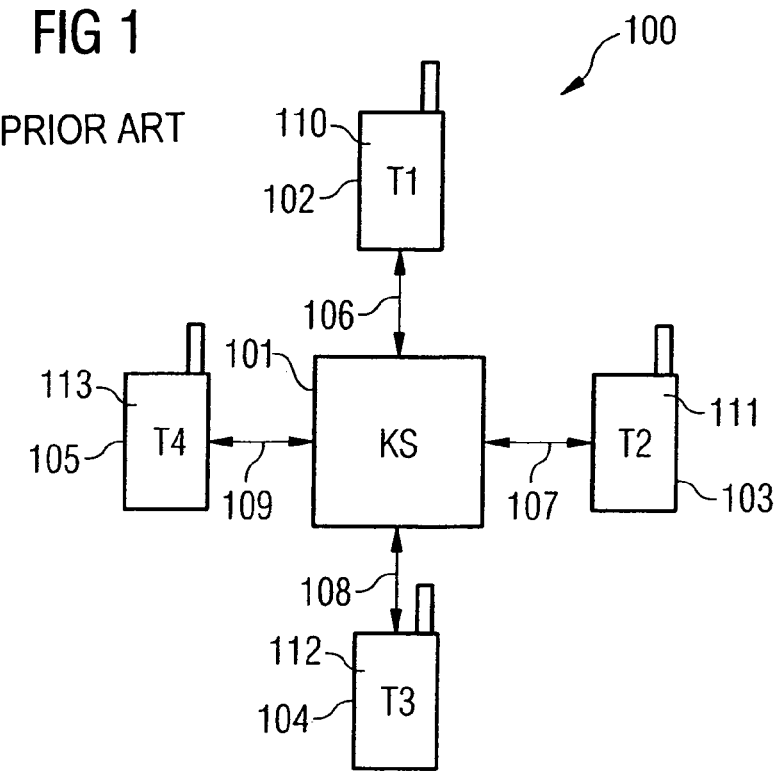
FIG. 1 shows the architecture of a centrally controlled conference according to the prior art.
Figure 2:
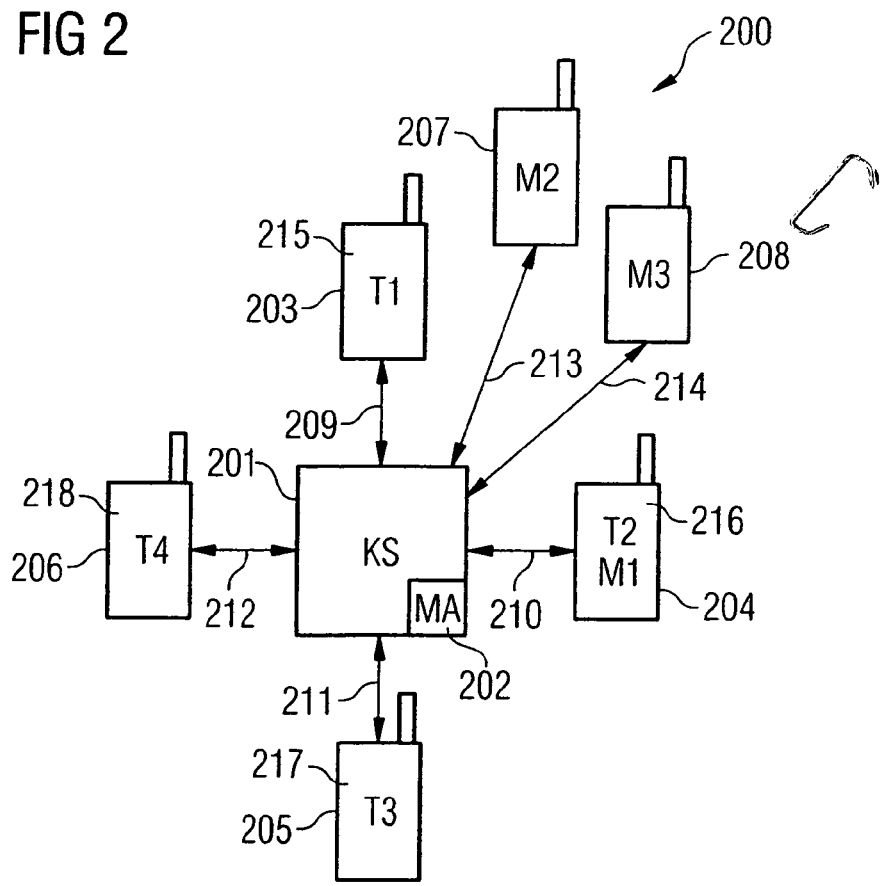
FIG. 2 shows the architecture of a centrally controlled conference having a plurality of moderator units according to the first embodiment of the invention.

A communication system 200 according to a first embodiment of the invention will be described below with reference to FIG. 2.

The communication system 200 also has a conference server device 201, a conference control unit 202 as well as a multiplicity of telecommunication terminals which are set up as mobile radio terminals in accordance with this exemplary embodiment and are referred to below as telecommunication devices (in accordance with this exemplary embodiment, a first telecommunication device 203, a second telecommunication device 204 (the telecommunication device 204 simultaneously being a first moderator unit), a third telecommunication device 205 and a fourth telecommunication device 206), a second moderator unit 207, a third moderator unit 208, a signaling link 209 between the communication server device 201 and the first telecommunication device 203, a signaling link 210 between the communication server device 201 and the second telecommunication device 204, a signaling link 211 between the communication server device 201 and the third telecommunication device 205, a signaling link 212 between the communication server device 201 and the fourth telecommunication device 206, a signaling link 213 between the communication server device 201 and the second moderator unit 207, a signaling link 214 between the communication server device 201 and the second moderator unit 208, a first conference participant 215 who is associated with the first telecommunication device 203, a second conference participant 216 who is associated with the second telecommunication device 204, a third conference participant 217 who is associated with the third telecommunication device 205, and a fourth conference participant 218 who is associated with the fourth telecommunication device 206.

The communication system 200 is embodied in accordance with the UMTS architecture described by 3GPP.

The communication system 200 provides a centrally controlled telecommunication conference, in which case, according to the first embodiment of the invention, four conference participants 215, 216, 217 and 218 are participating in the conference as users of the respective telecommunication devices 203, 204, 205 and 206, and the conference is controlled using the moderator units 204, 207 and 208, the conference participant 216 simultaneously also being a moderator, and the two moderator units 207, 208 not being conference participants. The allocation of communication rights is controlled using the three moderator units 204, 207 and 208.

Figure 3:
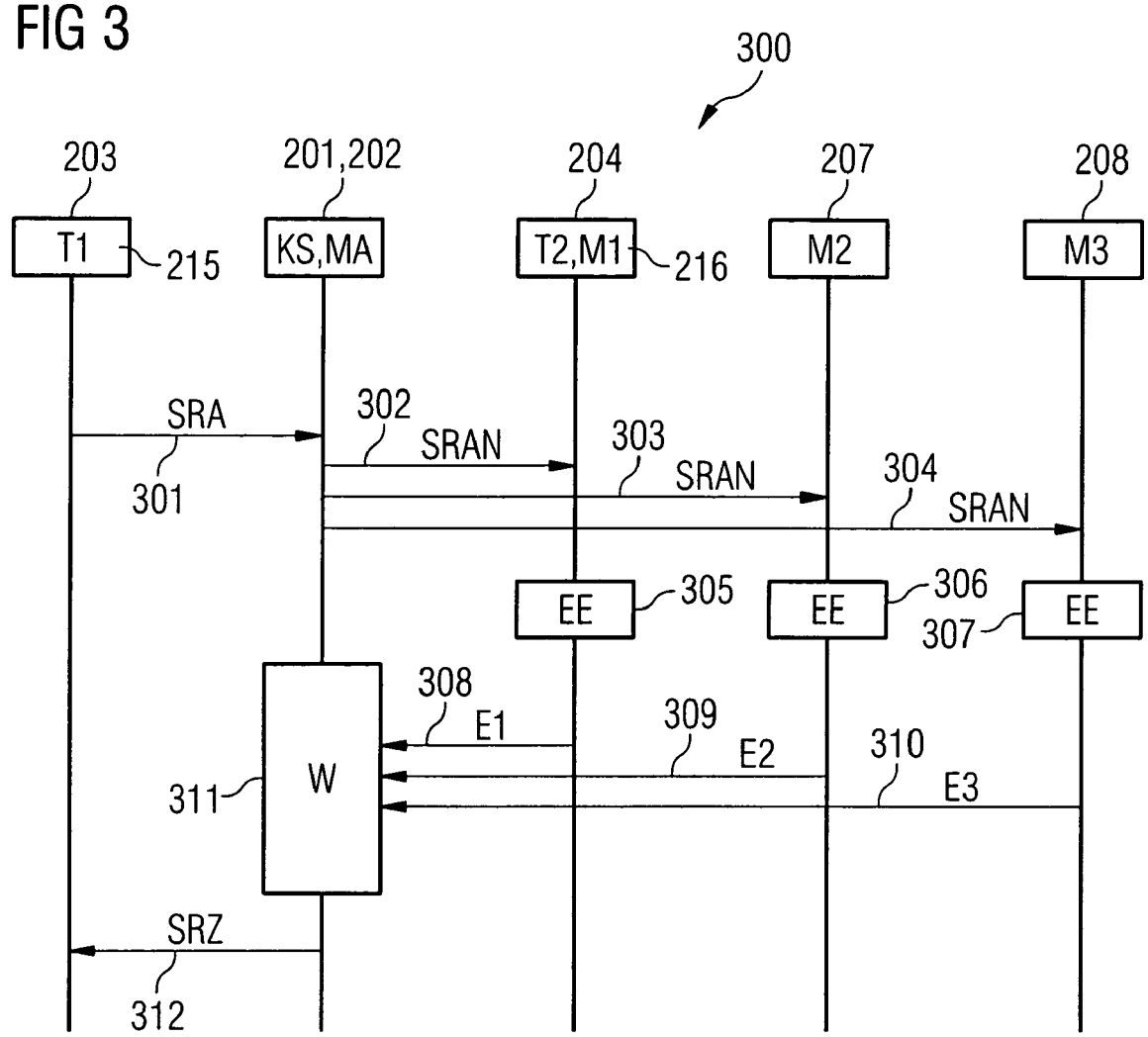
FIG. 3 shows a message flowchart for the allocation of communication rights using a plurality of moderator units according to the first embodiment of the invention.

A message flowchart 300 for the allocation of communication rights according to the first embodiment of the invention will be described below with reference to FIG. 3.

According to the communication system 200, the conference participants 215, 216, 217 and 218 communicate by voice. The associated telecommunication devices 203, 204, 205 and 206 do not communicate directly with one another but rather by means of the communication server device 201. The conference participant 215 would like to receive a right to speak. For this, the conference participant 215 must operate a key (which is designed for this purpose) on his telecommunication device 203 in order to send a right to speak request to the communication server device 201, a right to speak request message SRA 301 being generated using the telecommunication device 203 and this message being transmitted to the communication server device 201 using a transmission unit of the telecommunication device 203. The communication server device 201 respectively informs the moderator units 204, 207 and 208 of the right to speak request using corresponding right to speak request notifications 302, 303 and 304. According to the invention, the moderator units 204, 207 and 208 are informed of which of the conference participants 215, 216, 217 and 218 has requested a right to speak and the point in time at which this request was made or arrived at the conference server device 201. The moderator units 204, 207 and 208 each decide, in an individual decision EE 305, 306 and 307, which of the conference participants 215, 216, 217 and 218 is to receive a right to speak (the conference participants 217 and 218 are not shown in FIG. 3).

According to the invention, the moderators may specify, in the individual decisions, an actual point in time or an event for the point in time at which a communication right is granted to a telecommunication device. The event chosen may be, for example, when another conference participant finishes speaking. In other words, each of the individual decisions on the allocation of a communication right defines the point in time (for example the time of day) at which a telecommunication device is allowed to exercise its communication right.

Each moderator unit 204, 207 and 208 transmits its individual decision 305, 306 and 307 to the conference server device 201 in a respective message E1 308, E2 309 or E3 310, the conference server device 201 having a memory unit 311 in which the messages 308, 309 and 310 regarding the individual decisions are stored since, under certain circumstances, the moderator units 204, 207 and 208 do not make a decision simultaneously. The memory device is thus used to implement a "waiting function", the conference control unit 202 waiting for a prescribed period of time for the messages regarding the respective individual decisions 305, 306 and 307 of the moderator units 204, 207 and 208 in order to come to an overall decision.

According to the invention, if no message regarding a decision is transmitted by one or more of the moderator units 204, 207 and 208 within this period of time, this decision which is missing or has not arrived is not taken into account when coming to a decision.

The conference control unit 202 also uses a majority decision to decide which of the conference participants 215, 216, 217 and 218 receives the right to speak. If the majority decision is not unambiguous, the conference control unit 202 decides that the conference participant 215, 216, 217 or 218 who first requested a right to speak receives said right first after the speaking period of the preceding conference participant, this decision being implemented automatically. As shown in FIG. 3, the conference participant 215 receives the right to speak next and is informed of this using a right to speak assignment message SRZ 312.

Figure 4:
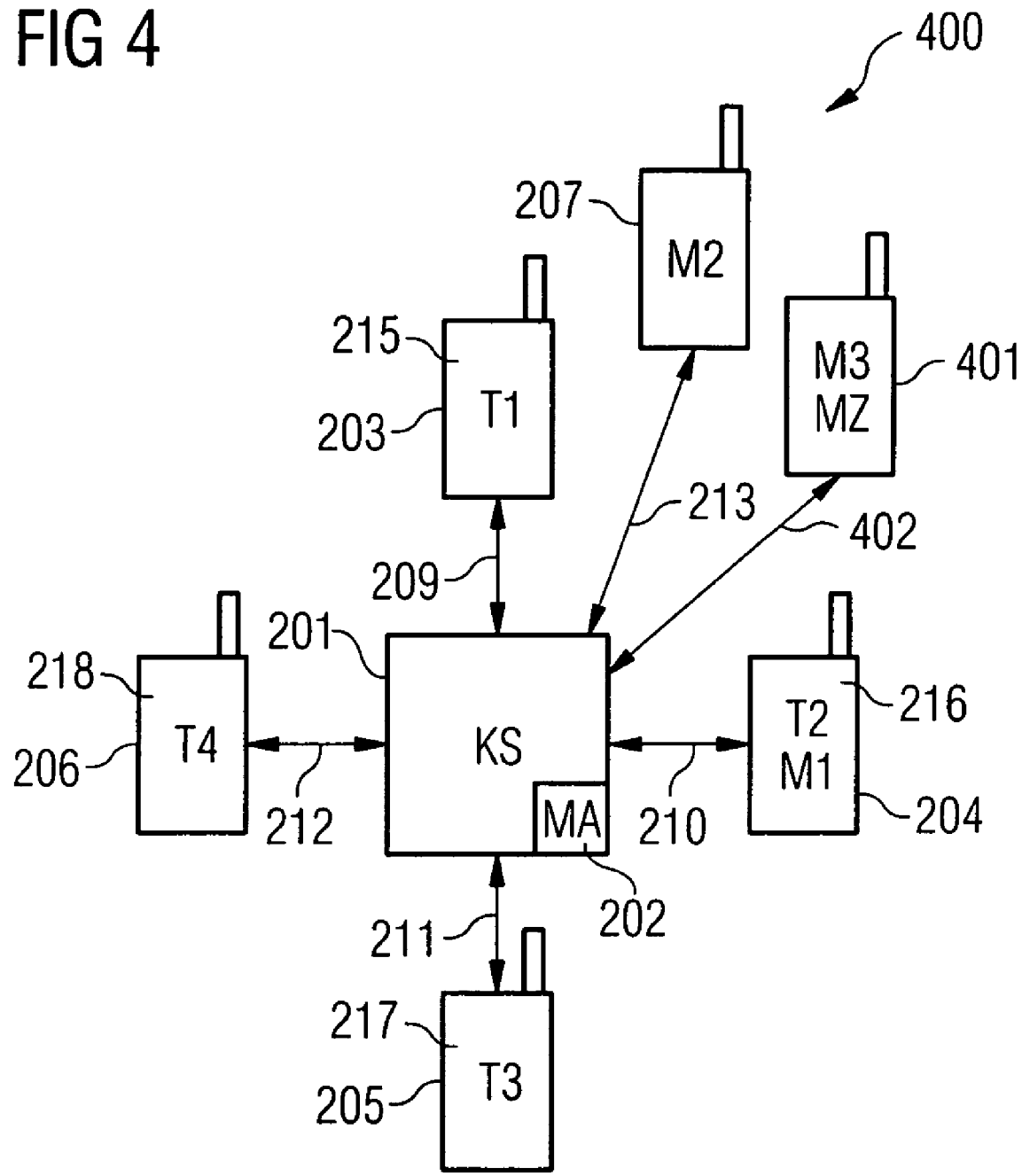
FIG. 4 shows the architecture of a centrally controlled conference having a plurality of moderator units and a moderator unit of second instance according to the second embodiment of the invention.

A communication system 400 according to a second embodiment of the invention will be described below with reference to FIG. 4.

The communication system 400 has the conference server device 201, the conference control device 202 as well as a multiplicity of telecommunication terminals which are set up as mobile radio terminals in accordance with this exemplary embodiment and are referred to below as telecommunication devices (in accordance with this exemplary embodiment, the first telecommunication device 203, the second telecommunication device 204 (which is simultaneously the first moderator unit 204), the third telecommunication device 205 and the fourth telecommunication device 206), the second moderator unit 207, a third moderator unit 401 (the moderator unit 401 not participating in the conference and being a moderator unit of second instance), the signaling link 209 between the communication server device 201 and the first telecommunication device 203, the signaling link 210 between the communication server device 201 and the second telecommunication device 204, the signaling link 211 between the communication server device 201 and the third telecommunication device 205, the signaling link 212 between the communication server device 201 and the fourth telecommunication device 206, the signaling link 213 between the communication server device 201 and the second moderator unit 207, a signaling link 402 between the communication server device 201 and the third moderator unit 401, the first conference participant 215 who is associated with the first telecommunication device 203, the second conference participant 216 who is associated with the second telecommunication device 204, the third conference participant 217 who is associated with the third telecommunication device 205, and the fourth conference participant 218 who is associated with the fourth telecommunication device 206.

The communication system 400 is embodied in accordance with the UMTS architecture described by 3GPP.

The communication system 400 provides a centrally controlled telecommunication conference, in which case, like the first embodiment of the invention, four conference participants 215, 216, 217 and 218 are participating in the conference as users of the respective telecommunication devices 203, 204, 205 and 206, and the conference is controlled using the moderator units 204, 207 and 401, the conference participant 216 simultaneously also being a moderator, the two moderator units 207, 401 not being conference participants, and the moderator unit 401 being a moderator unit of second instance. The allocation of communication rights is controlled using the moderator units 204, 207 and 401.

Figure 5:
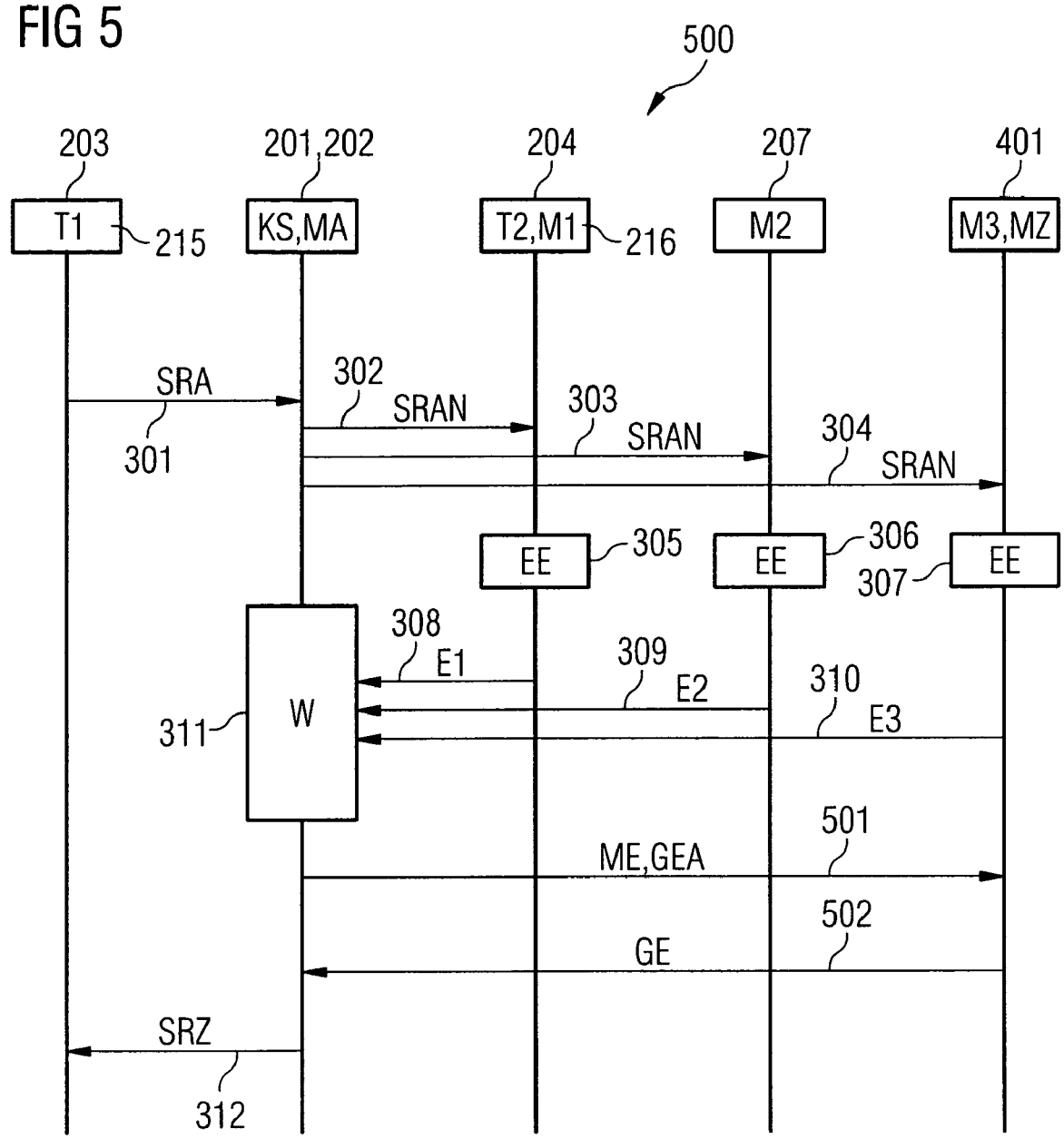
FIG. 5 shows a message flowchart for the allocation of communication rights using a plurality of moderator units and a moderator unit of second instance according to the second embodiment of the invention.

A message flowchart 500 for the allocation of communication rights according to the second embodiment of the invention will be described below with reference to FIG. 5.

According to the communication system 200, the conference participants 215, 216, 217 and 218 communicate by voice. The conference participant 215 would like to receive a right to speak. For this, the conference participant 215 must operate a key (which is designed for this purpose) on his telecommunication device 203 in order to send a right to speak request to the communication server unit 201, a right to speak request message SRA 301 being generated using the telecommunication device 203 and this message being transmitted to the communication server unit 201 using a transmission unit of the telecommunication device 203. The communication server unit 201 respectively informs the moderator units 204, 207 and 401 of the right to speak request using corresponding right to speak request notifications 302, 303 and 304. According to the invention, the moderator units 204, 207 and 401 are informed of which conference participant 215, 216, 217, 218 has requested a right to speak and the point in time at which this request was made. The moderator units 204, 207 and 401 decide, in individual decisions EE 305, 306 and 307, which conference participant 215, 216, 217 and 218 is to receive a right to speak (the conference participants 217 and 218 are not shown in FIG. 5).

According to the invention, the moderators may specify, in the individual decisions, an actual point in time or an event for the point in time at which a communication right is granted to a telecommunication device. The event chosen may be, for example, when another conference participant finishes speaking. In other words, each of the individual decisions on the allocation of a communication right defines the point in time (for example the time of day) at which a telecommunication device is allowed to exercise its communication right.

Each moderator unit 204, 207 and 401 transmits its individual decision 305, 306 and 307 to the conference server device 201 in a respective message E1 308, E2 309 or E3 310, the conference server device 201 having a memory unit 311 in which the messages 308, 309 and 310 regarding the individual decisions are stored since, under certain circumstances, the moderator units 204, 207 and 401 do not make a decision simultaneously. The memory unit 311 is thus used to implement a "waiting function", the conference control unit 202 waiting for a prescribed period of time for the message regarding the respective individual decisions 305, 306 and 307 of the moderator units 204, 207 and 401 in order to come to an overall decision. According to the invention, if no message regarding a decision is transmitted by one or more of the moderator units 204, 207 and 401 within this period of time, this decision is not taken into account when coming to a decision.

According to this exemplary embodiment, the conference is also configured in accordance with the "tightly coupled conferencing" described in Wu et al.

The conference control unit 202 also uses a majority decision to decide which of the conference participants 215, 216, 217 and 218 receives the right to speak. If the majority decision is not unambiguous, the conference control unit 202 informs the moderator unit 401 of the second instance of the individual decisions 305, 306 and 307 in a message 501, the moderator unit 401 being requested by the conference control unit 202, using an overall decision request message which is contained in the message 501, to make an overall decision. The moderator unit 401 informs the conference control unit 202 of the overall decision in a message 502, this decision then being automatically implemented. As shown in FIG. 5, the conference participant 215 receives the right to speak next and is informed of this using a right to speak assignment message SRZ 312.

The invention claimed is:

1. A communication system comprising a conference server device, a conference control unit, a plurality of moderator units, and a plurality of telecommunication devices, wherein:

the conference server provides at least one conference for the plurality of telecommunication devices, each of the plurality of telecommunication devices has a message generation unit for generating a communication request message and a transmission device for transmitting the communication request message to the conference server device, the conference server device has a receiver device for receiving the communication request messages, a message generation unit for generating a notification message if a communication request message has been received, and a transmission device for transmitting notification messages to all of the moderator units, each of the plurality of moderator units has a receiver device for receiving the notification messages, a message generation unit for generating a communication right decision message based on all of the notification messages, and a transmission device for transmitting the communication right decision message to the conference server device, the plurality of moderator units each decide, independently of one another, which telecommunication device is to be granted a communication right and informs the conference server device of these communication right individual decisions, the conference control unit automatically combines the communication right individual decisions of the plurality of moderator units to form an overall decision which specifies which telecommunication device is granted a communication right, and the communication right is granted to only a single telecommunication device within a conference as the right to transmit a data stream for a chosen communication medium.

2. The communication system as claimed in claim 1, wherein the communication system is configured in accordance with a 3GPP standard.

3. The communication system as claimed in claim 1, wherein the communication system is configured in accordance with the UMTS standard.

4. The communication system as claimed in one of claims 1, wherein each of the moderator units decides on the allocation of communication rights anonymously.

5. The communication system as claimed in claim 1, further comprising a communication right allocation device controlling the allocation of communication rights in accordance with the overall decision.

6. The communication system as claimed in one of claims 1, further comprising a communication right allocation unit allocating a communication right according to a rule base.

7. The communication system as claimed in claim 1, wherein the communication system is set up such that a communication right is respectively allocated for different communication means.

8. The communication system as claimed in claim 1, further comprising at least one higher-instance moderator unit which is coupled to the conference control unit and is set up such that, if the conference control unit cannot ascertain an unambiguous overall decision, the higher-instance moderator unit uses the communication right individual decisions to make an unambiguous overall decision which unambiguously specifies which telecommunication device is granted a communication right.

9. A method of controlling a conference in a communication system having a conference server device, a conference control unit, a plurality of moderator units, and a plurality of telecommunication devices, the method comprising:

the conference server device providing at least one conference for the plurality of telecommunication devices;

each of the plurality of telecommunication devices generating a communication request message and transmitting the communication request message to the conference server device;

the conference server device receiving the communication request messages, generating a notification message if a communication request message has been received, and transmitting notification messages to all of the moderator units;

each of the plurality of moderator units receiving notification messages, generating a communication right decision message based on all of the notification messages, and transmitting the communication right decision message to the conference server device;

the plurality of moderator units each deciding, independently of one another, which telecommunication device is to be granted a communication right and informing the conference server device of these communication right individual decisions;

the conference control unit automatically combining the communication right individual decisions of the plurality of moderator units to form an overall decision which specifies which telecommunication device is granted a communication right; and the communication right only ever being granted to one single telecommunication device within a conference as the right to transmit a data stream for a chosen communication medium.

10. A telecommunication conference control unit comprising:

a reception unit receiving communication right individual decision messages from a plurality of moderator units, each of which messages contains a proposal for an allocation of a communication right;

a decision unit that automatically makes an overall decision on the allocation of a communication right to a telecommunication device based on the communication right individual decision messages; and a message generation unit that generates an overall decision message in accordance with the overall decision, wherein the communication right is granted to only one single telecommunication device within a conference as a right to transmit a data stream for a chosen communication medium.

11. A method of controlling the allocation of communication rights, the method comprising:

receiving communication right individual decision messages from a plurality of moderator units, each of which messages contains a proposal for the allocation of a communication right;

automatically making an overall decision on the allocation of a communication right to a telecommunication device based on the communication right individual decision messages; and a message generation unit generating an overall decision message in accordance with the overall decision, wherein the communication right is granted to only one single telecommunication device within a conference as a right to transmit a data stream for a chosen communication medium.

12. A telecommunication conference control unit comprising:

means for receiving communication right individual decision messages from a plurality of moderator units, each of which messages contains a proposal for the allocation of a communication right;

means for automatically making an overall decision on the allocation of a communication right to a telecommunication device based on the communication right individual decision messages; and a message generation means for generating an overall decision message in accordance with the overall decision, wherein the communication right is granted to only one single telecommunication device within a conference as a right to transmit a data stream for a chosen communication medium.

* * * * *

UNITED STATES PATENT AND TRADEMARK OFFICE
CERTIFICATE OF CORRECTION

PATENT NO.       : 7,643,628 B2
APPLICATION NO.  : 11/337078
DATED            : January 5, 2010
INVENTOR(S)      : Hans et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Sixteenth Day of November, 2010

David J. Kappos
*Director of the United States Patent and Trademark Office*